US008152578B2

(12) United States Patent
Rigby et al.

(10) Patent No.: US 8,152,578 B2
(45) Date of Patent: Apr. 10, 2012

(54) DRIVE TRAIN COUPLING

(75) Inventors: Gary Rigby, Stroud (AU); Cheryl D. Rigby, Stroud (AU)

(73) Assignee: DBD Marine Pty Ltd., Sydney (AU)

( * ) Notice: Subject to any disclaimer, the term of this patent is extended or adjusted under 35 U.S.C. 154(b) by 762 days.

(21) Appl. No.: 11/794,870

(22) PCT Filed: Jan. 6, 2006

(86) PCT No.: PCT/AU2006/000017

§ 371 (c)(1), (2), (4) Date: Aug. 21, 2007

(87) PCT Pub. No.: WO2006/072143

PCT Pub. Date: Jul. 13, 2006

(65) Prior Publication Data

US 2008/0207337 A1 Aug. 28, 2008

(30) Foreign Application Priority Data

Jan. 6, 2005 (AU) ................................ 2005100145
Jan. 6, 2005 (AU) ................................ 2005900031

(51) Int. Cl.

| | |
|---|---|
| ***B63H 23/34*** | (2006.01) |
| ***B63H 1/15*** | (2006.01) |
| ***B63H 5/125*** | (2006.01) |
| ***B63H 21/30*** | (2006.01) |
| ***F16C 1/02*** | (2006.01) |
| ***F16D 3/10*** | (2006.01) |
| ***F16F 1/10*** | (2006.01) |
| ***F16F 1/13*** | (2006.01) |
| ***F16F 15/10*** | (2006.01) |
| ***F16F 15/123*** | (2006.01) |

(52) U.S. Cl. ................ 440/83; 440/52; 440/53; 440/57; 440/112; 464/58; 464/62.1; 464/64.1

(58) Field of Classification Search .................... 440/75, 440/79, 83, 111, 112, 52, 57; 267/4, 168, 267/289–291; 464/62.1, 64.1, 57, 58, 65.1, 464/160–162; 403/229
See application file for complete search history.

(56) References Cited

U.S. PATENT DOCUMENTS 1,387,726 A * 8/1921 Karge ............................ 464/57
1,472,782 A * 11/1923 Barber ............................ 464/58
3,435,905 A 4/1969 Lazarus
5,562,275 A 10/1996 Weissenfluh et al.
7,207,855 B2 * 4/2007 Rigby ............................ 440/83

FOREIGN PATENT DOCUMENTS

DE 102 57 637 A1 6/2004
WO WO 98/58838 12/1998

* cited by examiner

*Primary Examiner* — Ajay Vasudeva
(74) *Attorney, Agent, or Firm* — David B. Tingey; Kirton & McConkie

(57) ABSTRACT

A joint 10 is shown for transmission of torque between an input shaft 12 and an output shaft 14. In the form shown, the joint 10 comprises an outermost helical coil spring 16 and an innermost helical coil spring 18, both of which are connected at their respective opposite ends to the input shaft 12 and to the output shaft 14. The innermost helical spring 18 is arranged to be entirely located within, and co-axially aligned with, the outermost helical spring 16 along the same center-line. The springs 16, 18 are arranged to be counter wound relative to one another to provide delivery of torque in a stabilised manner reflected in a significant reduction in the vibration observed within the joint 10 during use. The joint 10 is also arranged for transmission of thrust (or axial force) between the input shaft 12 and the output shaft 14. The joint 10 comprises a plurality of substantially incompressible members in the form of ball bearings 22 that are located within the innermost helical spring 18 and which are contactable with one another to form a thrust transmitting assembly between the input shaft 12 and the output shaft 14.

37 Claims, 3 Drawing Sheets

DRIVE TRAIN COUPLING

FIELD OF THE INVENTION

The present invention relates to apparatus which enables the transmission of torque over a coupling joint. In one form the invention relates to a drive joint which has application in marine apparatus. The invention can also find use in motor vehicles, aircraft and industrial machinery.

BACKGROUND ART

Devices for the transmission of torque while being rotated are known in the art. Such devices include the so-called Hooke universal joints and Rzeppa constant velocity joints, and other types of joints which make use of a single spring coil (for example, AU2002300495 to this same inventor) to join two rotatable shafts. Some known devices for transmitting torque over a joint involve complex linkage arrangements which can be prohibitively costly, for example the use of back-to-back universal joints linked together. In the known devices, the coupling joint can transfer torque between the shafts, although the performance of both of the constant velocity and universal joint types can suffer when placed under load because severe strain can be placed on the joint, and in particular on any joining pins. In the known prior art, the joints can only function over a limited range of relative operating angles in order to avoid damage.

SUMMARY OF THE INVENTION

In a first aspect the present invention provides a joint adapted to transmit torque and axial thrust between an input element and an output element, the joint comprising:

- an outer helical spring connected between the input and output elements;
- an inner helical spring connected between the input and output elements, the inner helical spring being counter wound relative to the outer helical spring and coaxially located within the outer helical spring, the outer and inner helical springs arranged in use to transmit torque between the input and output elements; and
- a plurality of substantially incompressible members located within the inner helical spring and contactable with one another to form a thrust transmitting assembly between the input and output elements.

When the term "connected between" is used throughout this specification it is to be interpreted as a secure, permanent mechanical fixing or join between two items by any one of a number of possible techniques, for example welding, fastening, rivetting, bolting, gluing and any other suitable joining method.

When the term "substantially incompressible" is used throughout this specification it is to be interpreted as encompassing a material that can deform to some minor extent, for example a metal surface that can become slightly flattened under the application of pressure, or a stiff, partially-hollow item which can become slightly deformed in its normal shape during use, and then may or may not resiliently return to its original shape at a later time.

The joint of the first aspect has many advantages over the known apparatus. The counter wound springs that are connected to the input and the output elements are arranged in use to transfer all of the torque between the elements, whilst remaining in continuous physical contact with each element. The torque can be transferred in either direction between the elements.

These counter wound, coaxial helical springs are provided so that when a clockwise rotation of, say, the input element occurs, the outer helical spring tends to wind up and the inner spring tends to unwind. Thus the cross-wise diameter of the outer helical spring tends to contract while at the same time the cross-wise diameter of the inner helical spring tends to expand. As a result, the two helical springs exert physical pressure on each other in order to convey torque in a stable manner from the input element to the output element as well as to minimise vibration. When a counter-clockwise rotation of the input element occurs, the outer helical spring tends to unwind and the inner spring tends to wind up. Thus the cross-wise diameter of the outer helical spring tends to expand while at the same time the cross-wise diameter of the inner helical spring tends to contract, reaching a point where, as a result of the rotation, the outer helical spring cannot expand any further and the inner helical spring cannot contract any further. At this point the springs are exerting opposing forces against one another, thus stabilising the joint and limiting the vibration as torque is conveyed between the elements.

Furthermore, in this joint the plurality of substantially incompressible members are able to be moved in contact with one another during use so as to be able to transmit thrust across said members at the same time that torque is being transmitted via the springs. These members can be of any size and shape as long as they are located within the inner helical spring and are contactable with one another so as to be able to transmit thrust.

In one embodiment, the members can enable relative pivoting between the input and output elements, so that the elements can operate over a range of axial alignments. The members can be configured to allow this to occur, over a range of angles through which the dual springs can be deformed.

In one embodiment, the members can remain in continuous physical contact with each other during transmission of axial thrust. In one form of this, the joint can be used to transmit torque from the input element to the output element and to transmit thrust from the output element to the input element. The dual springs remain continuously connected with each element to transmit the torque therebetween. Typically the input element is rotatably driven by a drive (for example a motor), and typically the output element transmits the drive to a medium (e.g. a body of water, a road etc).

In one embodiment, respective adjacent members can engage at opposing contact surfaces, said surfaces being configured to remain in engagement during articulation of the adjacent members. In one form of this, the contact surfaces of respective adjacent members can engage at a single point of contact at any instant. In one form of this, the said points of contact of respective adjacent members can be aligned along a centreline of the members.

In one embodiment, the members can be positioned by the inner helical spring, that is, held in position by the inner helical spring. In one form, the members are balls, and in one arrangement the balls may be spherical, although other shapes of balls are possible so that articulation therebetween can occur as well as engagement at respective contact surfaces. In one form, the balls may comprise steel balls of the type commonly used as ball bearings.

In one embodiment, the substantially incompressible members may each have a diameter equal to or slightly less than the internal diameter of the inner helical spring. In still further embodiments, the members may have of a range of sizes whilst still being located within the inner helical spring.

In one embodiment, each element can have a perimeteral flange projecting out therefrom, each flange forming a seat for respective adjacent ends of the helical springs. In one form of this, the perimeteral flange can be formed by welding a metal material to each element, and thereby building up a perimeteral flange.

In one embodiment, the springs can be welded to the input and output elements. In one form of this, the springs may be connected to each other at a respective output element by welding. In one arrangement, a metal sleeve can be introduced between the inner and outer helical springs at an end region of said springs, with the sleeve becoming part of the welded connection during welding.

In any of the embodiments mentioned, each element can be a shaft for example in a drive train or a drive assembly of some sort.

In one embodiment, the outer helical spring can be enclosed within a flexible housing, and the housing arranged for sealing at each element to entirely enclose the helical springs and member against ingress by gas, fluids or solids.

In a further embodiment, a further flexible housing can be disposed within the outer helical spring to house the members. In one form of this, the further flexible housing may be disposed between the inner spring and the members. In an alternative arrangement, the further flexible housing may be disposed between the outer spring and the inner spring. In either of these forms the further flexible housing is arranged in use to contain a fluid substance, for example one of the group comprising a lubricant, a gel-like substance, a grease, a heat resistant substance and Silastic®, which is a silicone elastomer. The flexible housings can comprise one of the group comprising neoprene, urethane and rubber.

In a second aspect the present invention provides an inboard-outboard drive train for mounting on a boat, the drive train comprising:

- an input drive element having first and second ends, the first end being adapted for coupling to a drive in the boat;
- an output drive element having first and second ends, the second end being adapted for coupling to a propulsion element; and
- a joint for joining the input drive element second end to the output drive element first end, the joint comprising:
- an outer helical spring connected between the input and output elements; and
- an inner helical spring connected between the input and output elements, the inner helical spring being counter wound relative to the outer helical spring and coaxially located within the outer helical spring, the outer and inner helical springs arranged in use to transmit torque between the input and output elements;
- wherein the joint further comprises a plurality of substantially incompressible members located within the inner helical spring and contactable with one another and to form a thrust transmitting assembly between the input and output elements.

Such a drive train has many advantages over the known apparatus. The counter wound springs connected to the input and the output elements are arranged in use to transfer all of the torque between the elements, whilst remaining in continuous physical contact with each element. The torque can be transferred in either direction between the elements. The physical reasons why these counter wound, coaxial helical springs function to exert pressure on each other in order to convey torque in a stable manner has already been explained in relation to the first aspect.

In one embodiment, the joint of the second aspect can be as defined in the first aspect.

in one embodiment, the output drive element can be disposed in a housing. In one form of this, steering and trim control elements may be mounted on the boat and operatively coupled to the housing. In one arrangement, the trim control element may include a hydraulic ram. In one arrangement, the steering control element can include an arm mounted to the housing and pivotable with respect to the boat.

In any of these embodiments, the input element can be mounted at a thrust bearing disposed at a transom or keel of the boat.

In a third aspect, the present invention provides a boat including a bow section, a stern section, a drive, a propulsion element and the inboard-outboard drive train of the second aspect, the drive being mounted at the stern section of the boat, the first end of the input drive element being coupled to the drive, and the output drive element second end being coupled to the propulsion element.

In a fourth aspect, the present invention provides a drive apparatus for use in a drive assembly of a motor vehicle or an aircraft, the drive apparatus comprising a joint which is otherwise as defined in the first aspect.

BRIEF DESCRIPTION OF THE DRAWINGS

Notwithstanding any other forms which may fall within the scope of the present invention, embodiments of the invention will now be described, by way of example only, with reference to the accompanying drawings in which.

MODES OF CARRYING OUT THE INVENTION

Figure 1:
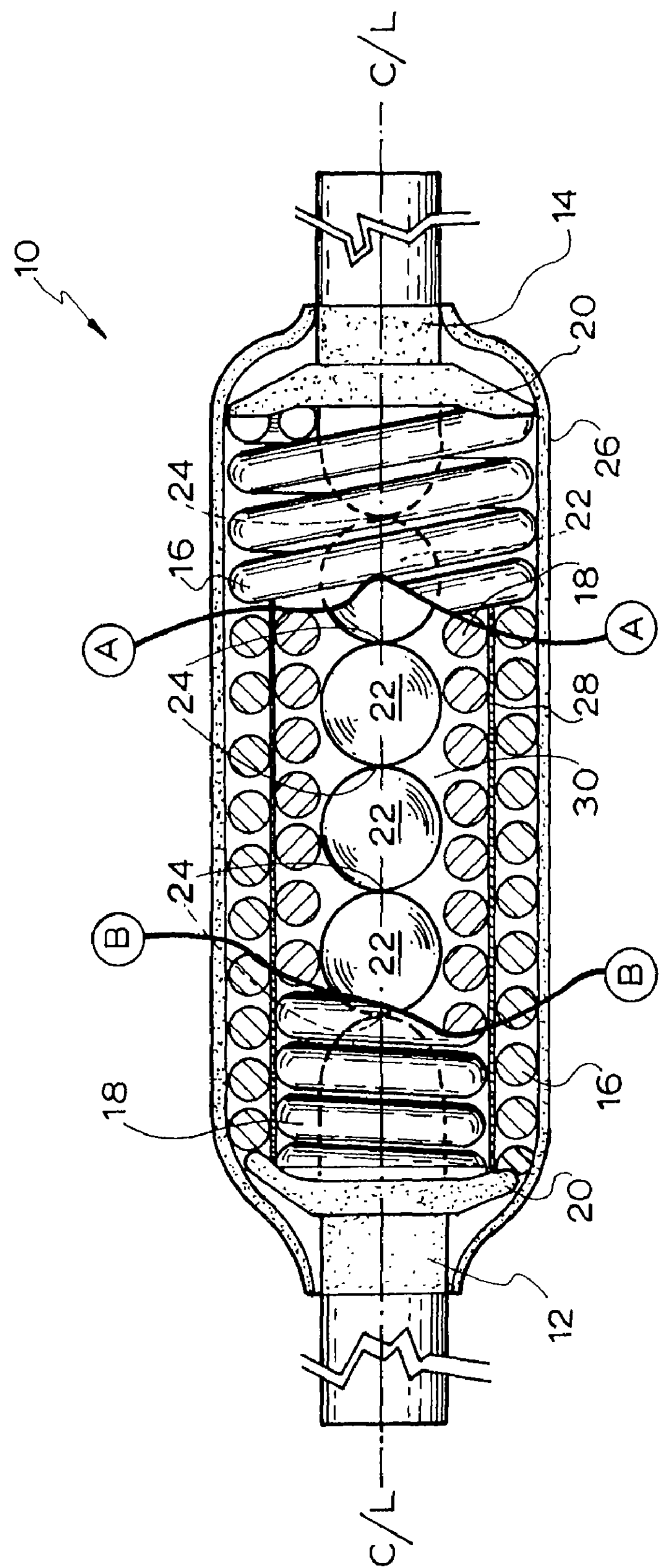
FIG. 1 shows a side part-sectional view of one embodiment of a joint for transmission of torque in accordance with the invention. In this Figure, the part of the joint that is to the left of the Line B-B is sectioned across the outer helical spring, so as to reveal the inner helical spring. In this same Figure, the part of the joint that is between the Line B-B and the Line A-A is sectioned across both the outer helical spring and the inner helical spring, so as to reveal the substantially incompressible members.
Figure 2:
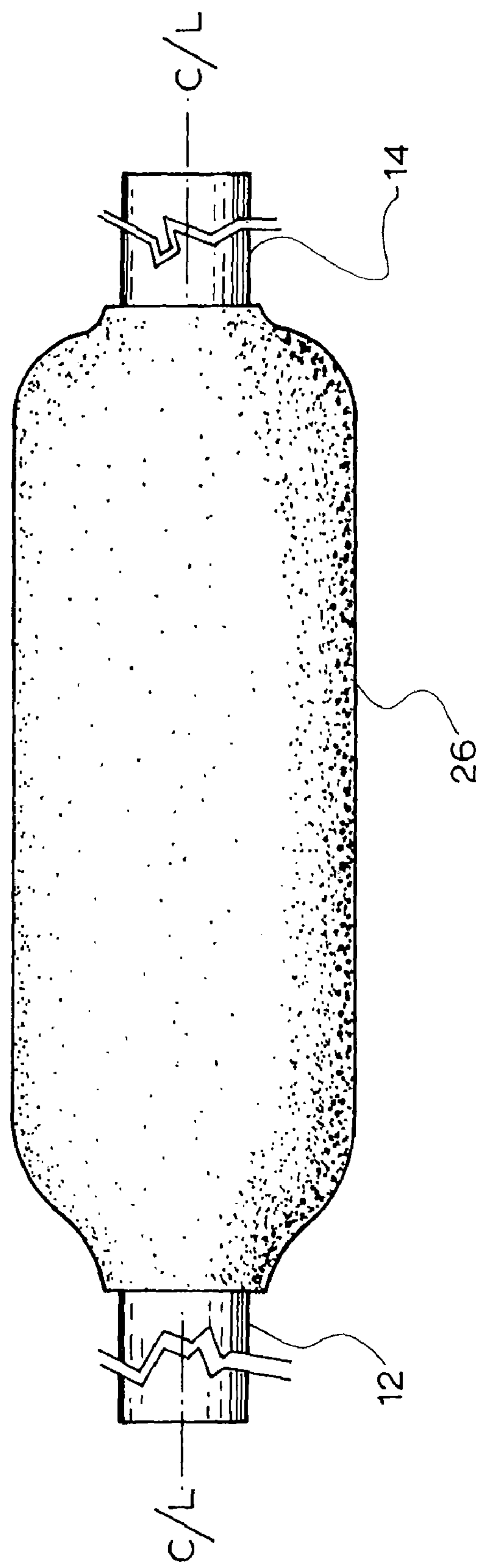
FIG. 2 shows a side view of the embodiment of FIG. 1 when the joint is disposed in a flexible housing.

Referring to FIGS. 1 and 2, a joint 10 is shown which is arranged for transmission of torque between an input shaft 12 and an output shaft 14. In the form shown, the joint 10 comprises an outermost helical coil spring 16 and an innermost helical coil spring 18, both of which are connected at their respective opposite ends to the input shaft 12 and to the output shaft 14.

The innermost helical spring 18 is arranged to be entirely located within, and co-axially aligned with, the outermost helical spring 16 along the centerline C/L. The springs 16, 18 are arranged to be counter wound relative to one another so that, when turning one shaft to which a spring is attached (for example if the shaft 12 is caused to rotate by being connected to a motor or other prime mover), the same rotation action will cause (a) both the innermost spring 18 to contract and the outermost spring 16 to expand in its respective cross-diameter size or, alternatively, (b) the innermost spring 18 to expand and the outermost spring 16 to contract in its respective cross-diameter size. In either circumstance, torque will be transferred from one shaft 12, 14 to the respective other shaft 12, 14 via both of the springs 16, 18, noting that the torque can be transferred in either direction between the shafts 12, 14.

The use of counter wound, coaxial helical springs provides great stability, because in one direction of rotation when the cross-wise diameter of the outermost helical spring 16 contracts, the cross-wise diameter of the innermost helical spring 18 expands, so that the two helical springs 16, 18 will exert a physical pressure upon each other in order to convey torque in a stable manner between the shafts 12, 14. In the opposite direction of rotation, where the cross-wise diameter of the outermost helical spring 16 expands while the cross-wise diameter of the innermost helical spring 18 contracts, the two springs reach a point where the respective expansion and contraction actions cannot proceed any further, and the springs 16, 18 are exerting opposing forces against one another, thus conveying torque in a stabilised manner between the shafts 12, 14. In both rotational directions, the delivery of torque in a stabilised manner is reflected by a significant reduction in the vibration observed within the joint 10 during use.

In the arrangement shown, each shaft 12, 14 has a perimeteral flange 20 projecting out therefrom, made of a welded metal material. These flanges 20 can be built up by welding metal pieces to the respective shafts, or by additive welding of molten welding substrate to build up a perimeteral flange. In one arrangement used by the inventors during the construction of the joint 10, a thin metal sleeve is introduced between the innermost 18 and outermost 16 helical springs in a terminal end region of the aligned spring pair 16, 18, with the sleeve becoming melted during the welding process for connection of the ends of each helical spring 16, 18 to the respective shaft 12, 14. Such a technique both forms a seat for respective adjacent ends of the helical springs 16, 18 as well as fusing these spring ends together at a respective shaft 12, 14. In further embodiments, other appropriate techniques can be used to seat the springs at the shafts, for example by pins, rivets or other securing devices.

The joint 10 shown in FIGS. 1 and 2 is also arranged for transmission of thrust (or axial force) between the input shaft 12 and the output shaft 14. Typically the input shaft 12 is rotatably driven by a drive (for example a motor), and typically the output shaft 14 transmits the drive to a medium (e.g. a body of water, a road etc). The joint 10 is arranged in use to transfer thrust from the output shaft 14 to the input shaft 12, for example if the output shaft 14 is operatively connected to a source of some kind of frictional resistance, such as a propeller in water or air. As the thrust is transmitted from the output shaft 14 to the input shaft 12 via the joint 10, the apparatus to which the input shaft 12 is connected can be caused to move, for example through the air or across a body of water.

As shown in the drawings, the joint 10 comprises a plurality of substantially incompressible members in the form of ball bearings 22 that are located within the innermost helical spring 18 and which are contactable with one another to form a thrust transmitting assembly between the input shaft 12 and the output shaft 14. The ball bearings 22 are held in position (and are caged) by the innermost helical spring 18. These ball bearings 22 also function to retard the extent of contraction of the cross-wise diameter of the innermost helical spring 18 during transmission of torque. In the embodiment shown, the ball bearings 22 are all of a common size, each having a diameter equal to or just slightly less than the internal diameter of the innermost helical spring 18. In the joint shown, the ball bearings 22 are each in surface contact with an adjacent ball bearing 22 or one of the shafts 12, 14 so as to be able to transfer thrust between the shafts 12, 14.

In further embodiments, the ball bearings may be arranged more loosely in the innermost helical spring 18 and therefore need to be moved into contact with one another during use, to enable transmission of thrust across the ball bearings at the same time that torque is being transmitted via the springs. In this regard, in some embodiments the innermost helical spring 18 may not necessarily be filled with ball bearings all the way along its length, and it is only when axial thrust is being transferred via the output shaft 14 into the joint that the springs 16, 18 can compress sufficiently so that each of the ball bearings comes into continuous physical contact with an adjacent ball bearing or one of the shafts 12, 14 themselves, so that thrust can pass between the shafts 12, 14. In such an arrangement when the transmission of thrust ceases, the ball bearings do not need to remain in continuous physical contact with each other, and can return to their original loose configuration. In any of these arrangements, and as previously described, when under rotation the springs 16, 18 continue to transmit torque between the input 12 and output 14 shafts by being connected to each shaft 12, 14, whether the spring becomes partially axially compressed in use, or not.

In the embodiment shown in FIGS. 1 and 2, the ball bearings 22 are suitable for enabling relative pivoting between the input 12 and output 14 shafts, so that these shafts can operate over a range of axial alignments, for example over an angle out of axial alignment of the order of 20, 30 or even 40 degrees. Of course the dual springs 16, 18 also have the capability of being deformed over such a selected angle and out of axial alignment so that torque can always be transmitted between the input 12 and output 14 shafts. Provided that the ball bearings and the input and output shafts remain in constant contact, thrust can also be transmitted over a range of axial alignments. During transmission of thrust, because of their shape the respective adjacent ball bearings 22 touch one another at a single point of contact 24 at any instant. Adjacent ball bearings can roll against each other whilst still remaining in contact with one another, thus allowing pivoting of the input 12 and output 14 shafts at the joint 10. The smooth contact surface of the ball bearings permits a wide freedom of movement of the joint 10 during such pivoting. It is noted that, at any instant, when a line is drawn between those single points of contact 24 that are located between any two adjacent ball bearings 22, the resulting line is aligned with the centreline of the ball bearings 22.

In still further embodiments, the substantially incompressible members may be in the form of balls which have a range of sizes whilst still being held within the innermost helical spring 18, rather than all being of an even diameter. In still further embodiments, different shapes of incompressible members can be used to contact one another so as to transmit thrust rather than simply the spherical steel ball bearings 22 shown in the Figures, for example members that are part-spherical in shape, eg. ovoid, egg, teardrop-shaped etc. These members can be of any size and shape as long as they are locatable within the innermost helical spring 18 and are contactable with one another so as to be able to transmit thrust.

In the embodiment shown in FIGS. 1 and 2, the entire joint 10 is enclosed by a flexible housing in the form of a sleeve or boot 26 which for example can be hot moulded from urethane or vulcanised using neoprene. The boot 26 can also be laminated. The boot 26 is located at the exterior of the outermost helical spring 16 and is sealed at each shaft 12, 14 so as to entirely enclose the helical springs 16, 18 and ball bearings 22 against ingress by gas, fluids or solids into the joint 10. Such materials may otherwise block the smooth operation of various components, and possibly cause deterioration or rusting thereof.

In the embodiment shown in FIGS. 1 and 2, a further flexible housing in the form of an inner boot 28 is disposed between outermost helical spring 16 and the innermost helical spring 18. The inner boot 28 is made of the same type of material as the boot 26, and is arranged in use to contain a fluid substance 30, for example one of the group comprising a lubricant, a gel-like substance, a grease (for example, extreme pressure grease), a heat resistant substance and Silastic®, which is a silicone elastomer. Such substances help to absorb vibration in the joint 10 and to lubricate the relative movement of the ball bearings 22 and innermost helical spring 18. Because these substances are retained at the joint 10 by the inner boot 28, there is no need for any further addition of these during the operational life of the joint 10. In a still further embodiment, the inner boot can be disposed between the innermost spring 18 and the ball bearings 22, if required.

The use of such flexible housings means that the apparatus can function in corrosive environments (eg seawater, aggressive liquid pulps etc) or in sterile environments (eg mixing systems for foods or pharmaceuticals). Without the presence of the inner boot 28 or the boot 26, the joint can still function well in a non-hostile environment, such as in the open air.

Figure 3:
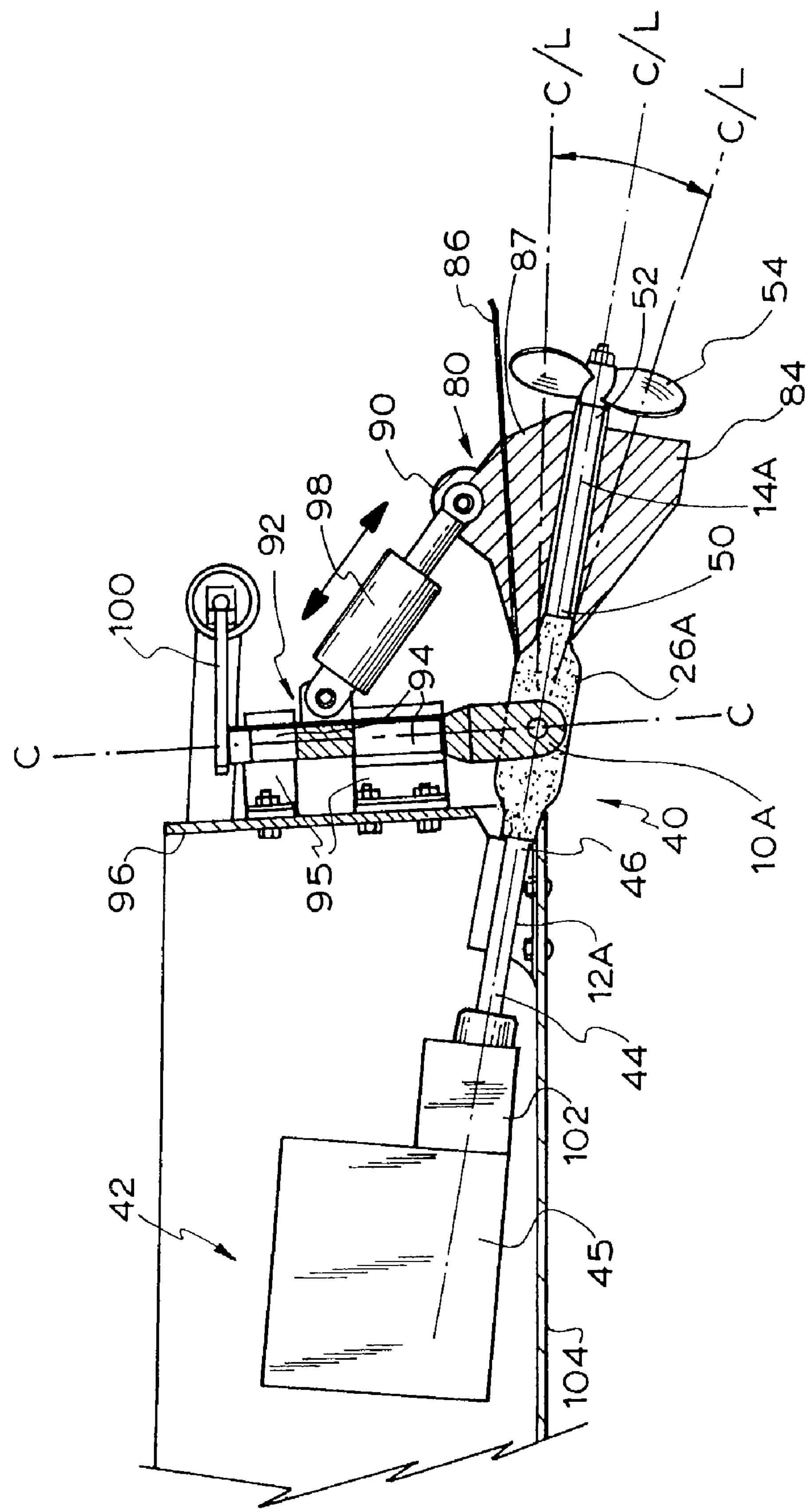
FIG. 3 shows a perspective view of one embodiment of an inboard-outboard boat drive in accordance with the invention, when mounted on a boat.

Referring now to FIG. 3, an inboard-outboard drive train 40 is shown mounted on a boat 42. In order to avoid repetition and for ease of reference similar components and features of this embodiment of the invention have been designated with an additional "A", such as the input shaft 12A. The drive train 40 includes an input drive shaft 12A having a first 44 and a second 46 end, the first end 44 adapted to be coupled to a drive in the form of an engine 45 mounted in the boat 42. Typically the input shaft 12A first end 44 is mounted to the engine 45 via a thrust bearing 102 disposed near the base of the transom 96 and adjacent to the keel 104, and generally at the stern of the boat 42. The drive train 40 also includes an output drive shaft 14A having a first 50 and a second 52 end, the second end 52 adapted to be coupled to a propulsion element in the form of marine propeller 54. The drive train 40 also includes the joint 10A which joins the input drive shaft second end 46 to the output drive shaft first end 50. As described hereinabove, in use the joint 10A transfers torque from the input drive shaft 12A to the output drive shaft 14A and transfers thrust from the output drive shaft 14A to the input drive shaft 12A. All of the details of the joint 10A are as otherwise described hereinabove and as shown in FIGS. 1 and 2.

Referring to FIG. 3, the output drive shaft 14A is disposed at a housing 80. The housing 80 has a rudder fin 84 fitted on its lower side to facilitate steering of the boat 42. A cavitation plate 86 is located on an upper side of the housing 80 and is joined to the housing by a web 87. Steering (left to right positioning of the drive train 40) and trim control (up or down positioning of the drive train 40) devices form part of the drive train 40 and are mounted on the boat 42 and operatively coupled to the housing 80. The upper surface of the cavitation plate 86 has a projecting flange 90. The joint 10A is also mounted via a support section 92 which is itself pivotally joined by support bushes 94 and support webs 95 to the transom 96 of the boat 42. Trim tilt control is effected by remote actuation of a hydraulic ram 98 operatively positioned between and pivotally linked to both the support section 92 and the projecting flange 90 located at cavitation plate 86. Steering control is effected by rotation of the tiller arm 100 to cause the support section 92 to pivot about the support bushes 94 on axis C-C and deflect the drive train 40 from side to side. Such deflection is facilitated by the flexible bending afforded by the joint 10A.

In further embodiments of the drive train, the cavitation plate, web and fin etc. can be of different shapes to those shown in the drawings, and the propeller does not need to be of the marine variety as shown but can be another suitable type of propeller depending on the fluid conditions and boating requirements. Other arrangements of trim pivoting mechanisms are envisaged which may be of a different arrangement to that shown in FIG. 3. The functionality of the joint 10A which allows trim and steering movement of the drive train as well as the transmission of torque and thrust remains a common element of all alternative arrangements.

In use the joint 10A in the drive train 40 is able to transmit a substantial axial force or thrust in conjunction with the ability to transfer large amounts of torque. A Hooke type universal joint in such an application would experience more variable angular velocity and attendant vibration and a Rzeppa constant-velocity type joint would be unable to transmit an axial force. The joint 10A of the invention, unlike a Rzeppa joint, minimises the effects of vibration in the driven shaft. The joint 10A of the invention is substantially unaffected by the problem of constant multi-impact loads applied to the output drive element (known in the art as the 'jackhammer effect', or in some marine applications as 'propeller slap'). The helical coil springs 16, 18 have the ability to take up or absorb these instantaneous loads.

The drive joint is simple to manufacture with few moving parts and is therefore simpler to build and maintain. Because of its simplicity, the drive train can also be of significantly less weight than conventional boat drive trains which can be of importance in racing boats, for example.

In use the flexible nature of the helical coil springs 16, 18 and of the ball bearings 22 allows the input shaft 12A and the output shaft 14A to be displaced over a significant angle out of alignment and still allow full transmission of torque and axial force (thrust). This gives the drive train 40 the flexibility of being used in either hard water (fully submerged in water), semi-surfacing or surface piercing applications depending upon the selected trim angle. Present boat drive train apparatus usually only allows a drive to be used in one or other of these situations.

The materials of construction of the joint can comprise any suitable materials which can be shaped, formed and fitted in the manner so described, such as metal or metal alloy coil springs and metal ball bearings. Alternatively the joint can be made of hard plastics to give a structurally sound device that can withstand the loads imposed and allow use in any corrosive environment (for example in contact with salt water).

It is to be understood that, if any prior art information is referred to herein, such reference does not constitute an admission that the information forms a part of the common general knowledge in the art, in Australia or any other country.

Whilst the invention has been described with reference to preferred embodiments it should be appreciated that the invention can be embodied in many other forms. Those skilled in the art will appreciate that the invention described herein is susceptible to variations and modifications other than those constructional features specifically described. For example, the springs can have any number of windings and there can be any number of ball bearings contained within the innermost spring, rather than the small number of ball bearings and windings shown in FIGS. 1 and 2. The invention need not be restricted to application in boat drives but rather extends to joints used in any drive assemblies or mixing apparatus, agricultural farm machinery, mining machinery and motor vehicles.

The invention claimed is:

1. A joint adapted to transmit torque and axial thrust between an input element and an output element, the joint comprising:

an outer helical spring connected between the input and output elements;

an inner helical spring connected between the input and output elements, the inner helical spring being counter wound relative to the outer helical spring and coaxially located within the outer helical spring, the outer and inner helical springs arranged in use to transmit torque between the input and output elements;

a sleeve disposed between the inner and outer helical springs, wherein a portion of the sleeve is disposed intermediate the input and output elements and a plurality of substantially incompressible members located within the inner helical spring, wherein the substantially incompressible members are contactable with one another to form an axial thrust transmitting assembly between the input and output elements.

2. A joint as claimed in claim 1 wherein the members enable relative pivoting between the input and output elements.

3. A joint as claimed in claim 1 wherein the members remain in continuous physical contact with each other during transmission of axial thrust.

4. A joint as claimed in claim 3 which is used to transmit torque from the input element to the output element and to transmit thrust from the output element to the input element.

5. A joint as claimed in claim 3 wherein respective adjacent members engage at opposing contact surfaces, said surfaces being configured to remain in engagement during articulation of the adjacent members.

6. A joint as claimed in claim 5 wherein the contact surfaces of respective adjacent members engage at a single point of contact at any instant.

7. A joint as claimed in claim 6 wherein the points of contact of respective adjacent members are aligned along a centreline of the members.

8. A joint as claimed in claim 1 wherein the members are positioned by the inner helical spring.

9. A joint as claimed in claim 8 wherein the members are balls.

10. A joint as claimed in claim 9 wherein the balls are spherical.

11. A joint as claimed in claim 9 wherein the balls comprise steel balls of the type commonly used as ball bearings.

12. A joint as claimed in claim 1 wherein the substantially incompressible members each have a diameter equal to or slightly less than the internal diameter of the inner helical spring.

13. A joint as claimed in claim 1 wherein each element has a perimeteral flange projecting out therefrom, each flange forming a seat for respective adjacent ends of the helical springs.

14. A joint as claimed in claim 13 wherein the perimeteral flange is formed by welding a metal material to each element.

15. A joint as claimed in claim 1 wherein the springs are welded to the input and output elements.

16. A joint as claimed in claim 15 wherein the springs are connected to each other at a respective output element by welding.

17. A joint as claimed in claim 16 wherein the sleeve comprises metal.

18. A joint as claimed in claim 1 wherein each element is a shaft.

19. A joint as claimed in claim 1 wherein the outer helical spring is enclosed within a flexible housing, and the housing is arranged for sealing at each element.

20. A joint as claimed in claim 19 wherein the flexible housing is arranged in use to contain a fluid substance.

21. A joint as claimed in claim 20 wherein the fluid substance is one of the group comprising a lubricant, a gel-like substance, a grease, a heat resistant substance and a silastic.

22. A joint as claimed in claim 19 wherein the flexible housing comprises one of the group comprising neoprene, urethane and rubber.

23. A joint as claimed in claim 1 wherein the sleeve is configured to contain a fluid substance.

24. A joint as claimed in claim 23 wherein the fluid substance is one of the group comprising a lubricant, a gel-like substance, a grease, a heat resistant substance and a silicone elastomer.

25. A joint as claimed in claim 1 wherein a flexible housing is disposed between the inner spring and the members.

26. A joint as claimed in claim 25 wherein the flexible housing comprises one of the group comprising neoprene, urethane and rubber.

27. A drive apparatus for use in a drive assembly of a motor vehicle or an aircraft, the drive apparatus comprising a joint as defined in claim 1.

28. A joint as claimed in claim 1 wherein the sleeve comprises one of the group comprising neoprene, urethane and rubber.

29. An inboard-outboard drive train for mounting on a boat, the drive train comprising:

an input drive element having first and second ends, the first end being adapted for coupling to a drive in the boat;

an output drive element having first and second ends, the second end being adapted for coupling to a propulsion element; and a joint for joining the input drive element second end to the output drive element first end, the joint comprising:

an outer helical spring connected between the input and output elements;

an inner helical spring connected between the input and output elements, the inner helical spring being counter wound relative to the outer helical spring and coaxially located within the outer helical spring, the outer and inner helical springs arranged in use to transmit torque between the input and output elements; and a sleeve disposed between the inner and outer helical springs wherein a portion of the sleeve is disposed intermediate the input and output elements;

wherein the joint further comprises a plurality of substantially incompressible members located within the inner helical spring, and wherein the substantially incompressible members are contactable with one another and to form an axial thrust transmitting assembly between the input and output elements.

30. A drive train as claimed in claim 29 wherein the output drive element is disposed in a housing.

31. A drive train as claimed in claim 30 wherein steering and trim control elements are mounted on the boat and operatively coupled to the housing.

32. A drive train as claimed in claim 31 wherein the trim control element includes a hydraulic ram.

33. A drive train as claimed in claim 31 wherein the steering control element includes an arm mounted to the housing and pivotable with respect to the boat.

34. A drive train as claimed in claim 29 wherein the input element is mounted at a thrust bearing disposed at a transom or keel of the boat.

35. An inboard-outboard drive train for mounting on a boat, the drive train comprising:

an input drive element having first and second ends, the first end being adapted for coupling to a drive in the boat;

an output drive element having first and second ends, the second end being adapted for coupling to a propulsion element; and a joint for joining the input drive element second end to the output drive element first end, the joint comprising:

an outer helical spring connected between the input and output drive elements; and an inner helical spring connected between the input and output drive elements, the inner helical spring being counter wound relative to the outer helical spring and coaxially located within the outer helical spring, the outer and inner helical springs arranged in use to transmit torque between the input and output drive elements;

wherein the joint further comprises a plurality of substantially incompressible members located within the inner helical spring, and wherein the substantially incompressible members are contactable with one another and to form an axial thrust transmitting assembly between the input and output drive elements, and wherein the drive is mounted at the stern section train of the boat with the first end of the input drive element being coupled to the drive in the boat, and the output drive element second end being coupled to the propulsion element.

36. A joint adapted to transmit torque and axial thrust between an input element and an output element, the joint comprising:

an outer helical spring connected between the input and output elements;

an inner helical spring connected between the input and output elements, the inner helical spring being counter wound relative to the outer helical spring and coaxially located within the outer helical spring, the outer and inner helical springs arranged in use to transmit torque between the input and output elements, each end of the inner and outer helical springs being rigidly connected to a surface of a flange with a weld or a securing device for being non-movably connected with a respective end of the input and output elements; and a plurality of substantially incompressible members located within the inner helical spring, wherein the substantially incompressible members are contactable with one another to form an axial thrust transmitting assembly between the input and output elements; wherein the outer and inner helical springs enable relative pivoting between the input and output elements and the incompressible members remain in continuous physical contact with each other to transfer thrust through the members both whilst the joint is transferring torque and during pivoting such that the joint is operative to transmit torque and thrust under angular displacement of the input and output elements.

37. An inboard-outboard drive train for mounting on a boat, the drive train comprising:

an input drive element having first and second ends, the first end being adapted for coupling to a drive in the boat;

an output drive element having first and second ends, the second end being adapted for coupling to a propulsion element; and a joint for joining the input drive element second end to the output drive element first end, the joint comprising:

an outer helical spring connected between the input and output elements; and an inner helical spring connected between the input and output elements, the inner helical spring being counter wound relative to the outer helical spring and coaxially located within the outer helical spring, the outer and inner helical springs arranged in use to transmit torque between the input and output elements, each of the inner and outer helical springs being rigidly connected to a surface of a flange with a weld or a securing device for being non-movably connected with a respective end of the input and output elements;

wherein the joint further comprises a plurality of substantially incompressible members located within the inner helical spring, and wherein the substantially incompressible members are contactable with one another and to form an axial thrust transmitting assembly between the input and output elements; and wherein the outer and inner helical springs enable relative pivoting between the input and output elements and the incompressible members remain in continuous physical contact with each other to transfer thrust through the members both whilst the joint is transferring torque and during pivoting such that the joint is operative to transmit torque and thrust under angular displacement of the input and output elements.

* * * * *